(12) United States Patent
Rossi

(10) Patent No.: US 12,551,010 B2
(45) Date of Patent: Feb. 17, 2026

(54) SHELF SUPPORT SYSTEM

(71) Applicant: L. & S. ITALIA S.P.A., Brugnera (IT)

(72) Inventor: Giuseppe Rossi, Varese (IT)

(73) Assignee: L. & S. ITALIA S.P.A., Brugnera (IT)

( * ) Notice: Subject to any disclaimer, the term of this patent is extended or adjusted under 35 U.S.C. 154(b) by 152 days.

(21) Appl. No.: 18/703,428

(22) PCT Filed: Oct. 11, 2023

(86) PCT No.: PCT/IB2023/060231
§ 371 (c)(1),
(2) Date: Apr. 22, 2024

(87) PCT Pub. No.: WO2024/079652
PCT Pub. Date: Apr. 18, 2024

(65) Prior Publication Data
US 2025/0221524 A1    Jul. 10, 2025

(30) Foreign Application Priority Data
Oct. 14, 2022   (IT) .................. 102022000021261

(51) Int. Cl.
*A47B 57/40* (2006.01)
*A47B 57/42* (2006.01)
*A47B 96/14* (2006.01)

(52) U.S. Cl.
CPC .............. *A47B 57/40* (2013.01); *A47B 57/42* (2013.01); *A47B 96/1458* (2013.01); *A47B 2096/1491* (2013.01)

(58) Field of Classification Search
CPC ..... A47B 57/40; A47B 57/42; A47B 96/1408; A47B 96/1458; A47B 96/145;
(Continued)

(56) References Cited

U.S. PATENT DOCUMENTS 4,065,904 A * 1/1978 Taylor ................... E04B 2/7854
   248/245
4,973,796 A * 11/1990 Dougherty ............. H02G 3/286
   174/495

(Continued)

FOREIGN PATENT DOCUMENTS

JP      2002165679 A  *  6/2002
WO      WO-9738610 A1 * 10/1997 .............. A47F 11/10

(Continued)

OTHER PUBLICATIONS

International Search Report From PCT/IB2023/060231, Dated Jan. 30, 2024.

*Primary Examiner* — Jennifer E. Novosad
(74) *Attorney, Agent, or Firm* — Carmel Patent Agency; Robert Ballarini

(57) ABSTRACT

A shelf support system includes an upright having: a profile-member made of electrically conductive material and comprising a cavity, an insulating element made of a first electrically insulating material and configured to be inserted in the cavity of the profile-member and comprising a housing, a rack made of electrically conductive material and comprising a connection structure configured to connect a shelf to the shelf support system, and a power supply device configured to supply electrical power to the rack. The rack is configured to be inserted in the housing of the insulating element so that the insulating element is interposed between the rack and the profile-member in order to prevent a passage of electric current from the rack to the profile-member. The connection structure of the rack includes a hole configured to be connected to a connection element associated with the shelf.

16 Claims, 3 Drawing Sheets

(58) Field of Classification Search
CPC ..... A47B 2096/1491; A47B 2220/0077; A47F 5/103; A47F 11/10
USPC .......................................................... 211/187
See application file for complete search history.

(56) References Cited

U.S. PATENT DOCUMENTS

| | | | | |
|---|---|---|---|---|
| 5,129,835 | A * | 7/1992 | DeFouw | H02G 3/288 |
| | | | | 439/211 |
| 5,348,485 | A * | 9/1994 | Briechle | H01R 25/14 |
| | | | | 439/121 |
| 5,425,648 | A * | 6/1995 | Farham | H01R 25/16 |
| | | | | 439/116 |
| 5,517,795 | A * | 5/1996 | Doke | E04F 13/081 |
| | | | | 248/243 |
| 5,758,585 | A * | 6/1998 | Latchinian | A47F 5/0846 |
| | | | | 362/127 |
| 6,047,838 | A * | 4/2000 | Rindoks | A47B 96/1458 |
| | | | | 211/187 |
| 6,527,565 | B1 * | 3/2003 | Johns | H01R 25/142 |
| | | | | 362/418 |
| 7,256,346 | B2 * | 8/2007 | Walter | H01R 25/14 |
| | | | | 52/36.6 |
| 9,098,823 | B2 * | 8/2015 | Slesinger | H01R 25/142 |
| 9,157,678 | B2 * | 10/2015 | Kerner | F25D 27/00 |
| 9,366,470 | B2 * | 6/2016 | Hastürk | F25D 25/02 |
| 9,831,642 | B2 * | 11/2017 | Woodley | A47F 5/103 |
| 10,184,622 | B2 * | 1/2019 | Dong | F21V 23/023 |
| 11,986,093 | B2 * | 5/2024 | Yang | A47B 96/1433 |
| 2008/0043456 | A1 * | 2/2008 | Bernardini | F25D 25/02 |
| | | | | 362/125 |
| 2011/0215212 | A1 * | 9/2011 | Keyvanloo | A47F 5/0823 |
| | | | | 248/220.22 |
| 2019/0298083 | A1 * | 10/2019 | Lee | F21V 21/35 |
| 2022/0173557 | A1 * | 6/2022 | Xue | A47B 96/06 |
| 2025/0221524 | A1 * | 7/2025 | Rossi | A47B 57/40 |

FOREIGN PATENT DOCUMENTS

| | | | | |
|---|---|---|---|---|
| WO | WO-2013087081 | A1 * | 6/2013 | ............... A47B 7/00 |
| WO | WO-2024079652 | A1 * | 4/2024 | ............... A47F 11/10 |

* cited by examiner

SHELF SUPPORT SYSTEM

CROSS-REFERENCE TO RELATED APPLICATIONS

This application is a § 371 National Phase of International Patent Application No. PCT/IB2023/060231, filed Oct. 11, 2023, which claims priority to Italian Patent Application No. 102022000021261, filed Oct. 14, 2022, the entire contents of all of which are incorporated by reference herein as if fully set forth.

FIELD OF THE INVENTION

The present invention relates to a shelf support system and a shelving unit comprising such a shelf support system.

BACKGROUND

Shelving units are known in various applications, for example, for furnishings, for industrial applications and so on. A shelving unit generally comprises a shelf support system to which at least one shelf is connected. The shelf support system generally comprises an upright, to which a shelf holder bracket, i.e. a bracket which is suitable for supporting a shelf can be connected.

Below, for simplicity, the shelf support system may also be called a "system" and the shelf holder bracket may also be called a "bracket".

The upright of the system may comprise a metal profile-member in which a rack is integrated, to which the bracket can be connected. The connection between the bracket and the rack can be brought about by means of a connection portion of the bracket which can be connected to a connection structure of the rack.

It is also known the possibility of supplying electrical energy to the shelving unit so as to apply voltage to specific areas of the shelving unit itself. It is thereby possible to supply electrical power to an electrical element which may, for example, comprise a lighting element which is present on the shelf.

One possible solution for supplying electrical energy to the shelves is to supply the shelf support system with electrical power, for example using an electrified line, which may be single or double and which can be inserted inside the metal profile-member near the rack. In this manner, when the bracket is connected to the rack, it also comes into contact with the electrified line and will therefore be supplied with electrical power by means of this electrified line. The connection between the electrified line and the connection portion of the bracket may have some disadvantages, for example, it may be imprecise and also sensitive to slight movements of the bracket which could cause a false contact. Furthermore, accidental contacts between the bracket and the profile-member may occur, which may apply voltage to portions of the profile-member in an undesirable manner, involving a risk to a user who may come into contact with such portions.

Another solution for supplying electrical energy to the shelving units may be to supply electrical energy directly to the upright, but this may also apply voltage to the profile-member with possible risks for a user who comes into contact therewith. Furthermore, standards exist, for example the standard EN IEC 60598-1, according to which it is necessary to limit a possible propagation of electrical energy over portions of the shelving unit which may come into contact with a user.

The problem addressed by the present invention is to provide a shelf support system and a relevant shelving unit which are structurally and functionally configured to at least partially overcome one or more of the disadvantages set out above with reference to the cited prior art.

SUMMARY

In particular, an object of the present invention is to provide a shelf support system and a relevant shelving unit to which it is possible to supply electrical energy in a particularly safe manner for a user.

Another object of the present invention is to provide a shelf support system and a relevant shelving unit in which the rack is electrically insulated for a user and at the same time is capable of supplying energy to an electrical element.

The problem and the objects indicated above are at least partially solved and achieved by the present invention by means of a shelf support system comprising one or more of the features expressed in the appended claims and a shelving unit comprising such a shelf support system.

In a first aspect thereof, the present invention relates to a shelf support system comprising an upright which includes a profile-member made of electrically conductive material, a rack made of electrically conductive material and an insulating element made of a first electrically insulating material. The system comprises a power supply device suitable for supplying electrical power to the rack. The insulating element is interposed between the rack and the profile-member in order to prevent a passage of electric current from the rack to the profile-member.

Therefore, the insulating element which is interposed between the rack and the profile-member serves to electrically insulate the rack from the profile-member. The rack is therefore not integrated in the profile-member but is instead separated therefrom by means of the insulating element and this allows the rack to be supplied with electrical power while avoiding electrical energy also being supplied to the profile-member. The profile-member remains electrically insulated from the rack and a user can come into contact with this profile-member without having to beware of a passage of current. It is thereby possible to remain within the limits imposed by the standards, for example by the standard EN IEC 60598-1, limiting a possible propagation of electrical energy over portions of the system which can come into contact with a user.

In the context of the present invention, the terms "supply electrical energy", "supply with electrical power", "apply voltage to", "pass electrical current", etc., are used as synonyms.

Preferably, the rack comprises a connection structure which is suitable for connecting a shelf to the shelf support system.

Preferably, the connection structure of the rack comprises a hole which is configured to connect the shelf to the rack.

Preferably, the hole is configured to be connected to a connection element which can be associated with the shelf.

The hole of the rack can also be referred to as a lozenge.

The connection element may be directly associated with the shelf or alternatively it may be indirectly associated with the shelf. In the latter case, the connection element may be comprised in a shelf holder bracket, as will be described in greater detail below. Preferably, the shelf holder bracket is suitable for supporting the shelf. It is advantageously possible to connect the bracket to the rack and to connect the shelf to the bracket. In this manner, the shelf can be connected to the rack, and therefore to the system, by means of the bracket.

Therefore, the hole is configured to connect the connection element and to support the shelf and where applicable the shelf holder bracket.

Advantageously, the profile-member comprises a cavity and the insulating element is configured to be inserted in the cavity.

Preferably, the insulating element comprises a housing and the rack is configured to be inserted in the housing of the insulating element so as that the insulating element is interposed between the rack and the profile-member. This allows a passage of electric current from the rack to the profile-member to be avoided.

Therefore, the rack is separated from the profile-member by means of the insulating element. In other words, the rack is not integrated in the profile-member, i.e. the rack and the profile-member do not form a single entity because they are separated by the insulating element.

Advantageously, the rack is shaped as a longitudinal member, i.e. it extends mainly in a longitudinal direction.

Preferably, the rack is substantially rectilinear and flat in shape. In other words, its thickness has marginal dimensions with respect to its length and its width. Preferably, the rack is shaped as a sheet.

Preferably, the insulating element and the profile-member are shaped as longitudinal members, i.e. they extend mainly in a longitudinal direction.

Advantageously, the cavity of the profile-member extends in the longitudinal direction. Preferably, the housing of the insulating element extends in the longitudinal direction.

Advantageously, the rack can be inserted in a sliding manner in the housing of the insulating element. Preferably, the insulating element can be inserted in a sliding manner into the cavity of the profile-member. Advantageously, these insertions can be carried out in the longitudinal direction.

Preferably, the rack is made of metal material, even more preferably of carbon steel.

The profile-member is advantageously configured to contain the rack and the insulating element.

Advantageously, the profile-member is configured as a drawing member made of metal material, even more advantageously of anodized aluminum.

Preferably, the profile-member may comprise a connection device which is suitable for connecting the system to an external element. This external element may, for example, be a wall, a partition, a panel, etc. It is thereby possible to connect the upright to this external element. In some embodiments, the upright may form part of a shelving unit which is capable of standing without the external element (self-standing shelving unit), and in this case the profile-member may not have this connection device.

Preferably, the shelf support system includes the shelf holder bracket. Advantageously, this bracket is made of electrically conductive material. Preferably, the bracket can be connected to the upright. Advantageously, the bracket comprises a body which is suitable for supporting the shelf. Preferably, the bracket comprises a connection portion which can be connected to the connection structure of the rack. Advantageously, the bracket is covered with an electrically insulating covering. Preferably, this covering covers the bracket with the exception of a first area, extending at the connection portion, and a second area, extending on the body. Advantageously, the first area extends at the connection portion so as to allow the passage of the electric current from the rack to the shelf holder bracket and the second area extends on the body so as to allow the passage of the electric current from the shelf holder bracket to an electrical element which is connected to the shelf holder bracket at the second area.

By means of the electrically insulating covering, it is possible to protect a user from the passage of electric current in the bracket, therefore a user can come into contact with this covered bracket without having to beware of the passage of current. In this manner, it is possible to remain within the limits imposed by the standards, for example by the standard EN IEC 60598-1, limiting a possible propagation of electrical energy over portions of the system which can come into contact with a user.

Preferably, the bracket is almost completely covered by the electrically insulating covering with the exception of predetermined areas, where it is necessary to draw or supply electrical energy. These predetermined areas may comprise the first area and second area. Advantageously, the first area comprises the connection portion, i.e. the first area extends at the connection portion. In this manner, the connection portion is not electrically insulated and this allows the rack to supply electrical energy to the bracket when the connection portion of the bracket is connected to the connection structure of the rack. Preferably, the second area extends on the body of the bracket and is suitable for supplying the electrical energy which is taken from the rack. In other words, the second area acts as an access point to the electrical energy of the bracket.

Advantageously, this electrical energy may be supplied to an electrical element which is electrically in contact with this second area. Preferably, this electrical element may, for example, comprise a lighting element, for example an LED lamp, which is present on the shelf. Advantageously, the second area extends on the bracket so as to be readily accessible for the electrical element to be supplied. Advantageously, the second area is distal with respect to the connection portion.

Preferably, the first area extends in such a manner that the connection element is not affected by the electrically insulating covering. This allows the passage of current from the rack once this connection element is connected to the respective hole of the rack.

Preferably, the first area extends mainly in the longitudinal direction. Advantageously, the first area extends so as to be completely inside the insulating element when the connection portion is connected to the connection structure of the rack.

Advantageously, the second area has dimensions which are limited with respect to the covering. This allows a user to be safeguarded as much as possible from the passage of current in the bracket because, by limiting the dimensions of the second area, it is improbable that the user will accidentally come into contact therewith. Preferably, the second area is shaped as an electrical contact. This electrical contact preferably has limited dimensions and may have a great variety of shapes, for example, it may be circular or elliptical.

Preferably, the bracket may comprise a plurality of second areas. These second areas may act as access points to the electrical energy of the bracket. By means of the second areas, it is possible to supply electrical energy to respective electrical elements which are placed electrically in contact therewith.

Preferably, the bracket is made of metal material, even more preferably of carbon steel and aluminum.

It is advantageously possible to connect a plurality of brackets to the rack. The number of brackets which are connected may depend on the number of shelves to be connected to the system.

Advantageously, the connection portion is connected to the support structure, allowing the rack and bracket to be connected and therefore, consequently, so as to connect the shelf to the shelf support system. The bracket allows the shelf to be connected to the system in a particularly easy manner.

In alternative embodiments, the bracket is not present and the shelf can be connected directly to the system: in this case, the shelf itself may comprise the connection portion so as to be directly connectable to the connection structure of the rack.

Therefore, the connection portion may be included in the shelf holder bracket or alternatively directly in the shelf in accordance with the embodiment. Preferably, the rack and/or the bracket has/have been subjected to a copper-plating and nickel-plating processing operation. This copper-plating and nickel-plating processing operation serves to increase the quality of distribution of the current.

Advantageously, the electrically insulating covering comprises a paint coating, even more advantageously an epoxy powder paint coating.

Using a paint coating as the covering allows the series production of the brackets to be made easier. Furthermore, the paint coating allows second areas with limited dimensions and with particularly precise forms to be obtained.

The Applicant has noted that the epoxy powder paint coating provides a favourable compromise between electrically insulating properties and production costs.

Advantageously, the paint coating is applied above the copper-plating and nickel-plating processing.

Preferably, the connection portion of the shelf holder bracket comprises the connection element. The connection element is advantageously suitable for being connected to the hole of the rack.

Preferably, the connection element is shaped as a tooth. Advantageously, the hole of the connection structure of the rack is configured so as to receive the connection element shaped as a tooth.

This type of connection allows a particularly stable connection between the bracket and rack to be obtained.

Preferably, the hole is suitable for receiving the connection element in a connection direction. Advantageously, this connection direction is perpendicular to the longitudinal direction.

Preferably, the hole has a shape which substantially complements the shape of the connection element. Preferably, the hole is a through-hole. Alternatively, the hole may be a blind hole.

Preferably, the hole may have a square shape which extends mainly in the longitudinal direction. In some embodiments, the hole may have a lozenge-like shape.

Preferably, the connection portion of the bracket comprises a plurality of connection elements. Preferably, the plurality of connection elements extends in the longitudinal direction.

Advantageously, the connection structure of the rack comprises a plurality of holes. Preferably, the plurality of holes of the rack are arranged in the longitudinal direction.

The holes of the rack are advantageously configured to be connected to the respective connection elements.

Preferably, the connection elements are shaped as teeth.

Preferably, the connection portion of the bracket comprises a plurality of connection elements shaped as teeth and the connection structure of the rack comprises a plurality of holes.

Preferably, these connection elements are spaced apart from each other and these holes are spaced apart from each other so as to allow multiple connections between connection elements and holes, respectively.

In the alternative embodiments, in which the bracket is not present and the shelf can be connected directly to the system, the connection portion of the shelf may preferably comprise a connection element which is suitable for interfacing with a respective hole of the rack. This connection element is substantially similar to the one described for the embodiments in which the bracket is present.

In alternative embodiments, the connection structure of the rack may comprise a connection element, which is preferably shaped as a tooth, and the connection portion of the shelf holder bracket or the shelf may comprise a hole which is suitable for receiving the connection element. Said connection element and said hole are substantially similar to the ones described for the embodiments in which the rack comprises the hole and the bracket or the shelf comprises the connection element.

Preferably, the first area extends in the longitudinal direction in such a manner that the plurality of connection elements is not affected by the electrically insulating covering. Advantageously, the first area extends over the entire dimension of the bracket in the longitudinal direction.

Preferably, the housing of the insulating element comprises a seat which is suitable for receiving the rack. Advantageously, said seat and the rack are connected by means of shape coupling connection.

In other words, the rack advantageously has an external profile with a shape which complements the shape of an internal profile of the seat.

It is thereby possible to position the rack in the seat in a particularly stable and precise manner, facilitating the connection between the rack and the bracket.

Preferably, the insulating element develops as a sort of casing around the rack, limiting possible movements thereof.

Advantageously, the insulating element comprises transverse walls which delimit the seat. Preferably, the spacing between the transverse walls defines a width of the seat. Advantageously, the width of the seat substantially corresponds to the thickness of the rack. Preferably, a width of the transverse walls may be at least equal to the width of the rack. Advantageously, the transverse walls can be closed at the transverse ends thereof, limiting possible movements of the rack in the transverse direction.

Advantageously, the insulating element comprises an opening, through which the bracket can be introduced into the housing of the insulating element so as to be connected to the rack.

Preferably, the opening allows the passage of the connection portion. In accordance with the embodiment, this connection portion can be part of the shelf or the bracket.

In the embodiment in which the bracket is not present and in which the shelf can be directly connectable to the system, this opening is shaped so as to allow the direct connection of the shelf to the rack. If the shelf comprises an individual connection portion, the opening is shaped so as to allow the passage of the connection portion into the housing so as to be connected to the rack.

Preferably, the housing of the insulating element comprises a channel which is shaped so as to guide the insertion of the bracket into the housing. This allows the connection of the connection portion of the bracket to the connection structure of the rack to be promoted.

Preferably, the insulating element may comprise lateral walls which delimit the channel. Advantageously, the spacing between the lateral walls defines a width of the channel. Advantageously, the width of the channel substantially corresponds to a thickness of the connection portion of the bracket. In this manner, the lateral walls of the channel allow to form a guide for directing the connection portion of the bracket towards the connection structure of the rack, making the connection between the bracket and the rack easier.

Preferably, the housing is formed in such a manner that the channel is placed at the connection structure of the rack. In this manner, the connection portion of the bracket may be readily connected to the connection structure of the rack.

Advantageously, the insulating element is shaped so as to wrap around the first support area when it is connected to the rack.

This allows the first area, not covered, of the bracket to be electrically insulated from the profile-member, preventing propagations of electrical energy from the bracket to the profile-member.

Preferably, the insulating element is formed so as to wrap around opposite sides of the first area. Advantageously, the lateral walls are formed so as to be interposed between these opposite sides and the profile-member. It is thereby possible to separate the profile-member from the first area of the bracket in a particularly effective manner when it is connected to the rack.

Preferably the first area extends in a limited manner in the connection direction so as to be inside the channel once the connection portion is connected to the connection structure of the rack.

Preferably, a width of the lateral walls may be at least equal to a width of the first support area. It is thereby possible to prevent possible occurrences of contact of the first support area with the profile-member which could cause dispersions of electrical energy. Preferably, these dimensions are intended to be understood in the connection direction.

Advantageously, the channel and the connection portion of the bracket can be connected by means of shape coupling connection.

Preferably, the insulating element comprises a front portion which includes the opening.

Advantageously, the insulating element comprises a rear portion which is suitable for receiving the connection portion of the bracket when it is connected to the rack. In this manner, the rear portion may wrap around the connection portion of the bracket and at least a portion of the first area, electrically insulating it from the profile-member and preventing dispersions of electrical energy.

Preferably, the rear portion is closed. In this manner, the connection portion of the bracket can move into abutment against the rear portion, facilitating the connection between the bracket and rack.

Preferably, the cavity of the profile-member and the insulating element are connected by means of shape coupling connection.

In other words, the insulating element advantageously has an external profile-member with a shape which complements the shape of an internal profile of the cavity.

It is thereby possible to increase the stability of the insulating element in the cavity of the profile-member.

Preferably, the upright comprises a spacer which is made of a second electrically insulating material.

The spacer is suitable for preventing the rack from being able to come out of the upright, moving into contact with external elements to the upright, for example with the floor, therefore avoiding dispersions of electrical energy.

Advantageously, the spacer can be inserted in the cavity of the profile-member so as to close the profile-member at the bottom in order to become an end stop element for the insulating element and for the rack.

Advantageously, the spacer can be inserted in the cavity through a lower opening of the profile-member.

In this manner, the spacer is advantageously suitable for preventing the insulating element and the rack from coming out of the profile-member through the lower opening of the profile-member.

Preferably, the spacer and the cavity of the profile-member are connected by means of shape coupling connection. In other words, the spacer advantageously has an external profile with a shape which complements the shape of an internal profile of the cavity.

Preferably, the spacer is retained in the cavity of the profile-member by a locking element which is connected to the profile-member, for example, a threaded plate. Advantageously, the spacer comprises an engaging element so as to be fixedly joined to the rack and to prevent it from sliding in the longitudinal direction, also using the friction present between the spacer and the profile-member.

Alternatively, the spacer may be retained in the cavity of the profile-member, for example, by interference.

In some embodiments, the spacer may be able to be inserted in the housing of the insulating element so as to close the insulating element at the bottom in order to become an end stop element for the rack.

Preferably, the spacer can be inserted in the housing of the insulating element through a lower opening of the insulating element.

In this manner, the spacer is advantageously suitable for preventing the rack from leaving the insulating element through the lower opening of the insulating element.

Preferably, the spacer and the housing of the insulating element are connected by means of shape coupling connection. In other words, the spacer advantageously has an external profile with a shape which complements the shape of an internal profile of the housing.

In alternative embodiments, the spacer may not be present in the system. In this case, for example, the insulating element may comprise a lower wall which is suitable for providing an end stop element for the rack.

Preferably, the first electrically insulating material is a polymer material, more preferably polycarbonate, even more preferably polycarbonate V0.

The Applicant has noted that this material provides a favourable compromise between insulating properties and production costs.

Advantageously, the first and second electrically insulating material may be the same material. Alternatively, the second electrically insulating material may preferably be a different polymer material.

Preferably, the power supply device comprises an electric wire which is connected to the rack, even more preferably a riveted, unipolar wire.

This solution allows voltage drops to be avoided and the solidity of the connection to be ensured.

Advantageously, the wire is connected to a power supply which is suitable for supplying electrical energy to the rack by means of the wire. Preferably, a power of the power supply may depend on the number of electrical elements that are expected to be powered by means of the system. For example, if three brackets are connected to the rack, it is expected that the consumption of electrical energy may be triple of a case in which a single bracket is connected to the rack.

According to another aspect of the invention, a shelving unit is provided comprising a shelf support system and at least one shelf connected to the shelf support system.

By means of the shelving unit comprising the shelf support system according to the present invention, it is possible to limit a possible propagation of electrical energy over portions of the shelving unit which may come into contact with a user. It is thereby possible to remain within the limits imposed by standards, for example the standard EN IEC 60598-1.

In a preferred embodiment, the shelving unit may comprise a shelf support system which includes at least two uprights to each of which at least one bracket is connected. Preferably, the at least two uprights are parallel with each other and spaced apart from each other. Advantageously, the uprights are arranged vertically, i.e. parallel with a direction which is defined by gravitational force. In this case, the longitudinal direction X may preferably be parallel with the direction of gravitational force. Preferably, each bracket which is connected to the upright of the at least two uprights is arranged so as to be aligned with a corresponding bracket which is connected to another upright of the at least two uprights in such a manner that these aligned brackets can support a shelf. Advantageously, these brackets are aligned horizontally.

Preferably, the shelf may be connected to the aligned brackets by means of threaded connection. In alternative embodiments, the shelf may be supported on such aligned brackets. In additional alternative embodiments, the brackets may be integrated in the shelf.

BRIEF DESCRIPTION OF THE DRAWINGS

The features and advantages of the invention will be better appreciated from the detailed description of a preferred exemplary embodiment thereof which is illustrated by way of non-limiting example with reference to the appended drawings, in which.

DETAILED DESCRIPTION OF THE PREFERRED EMBODIMENTS

Figure 1:
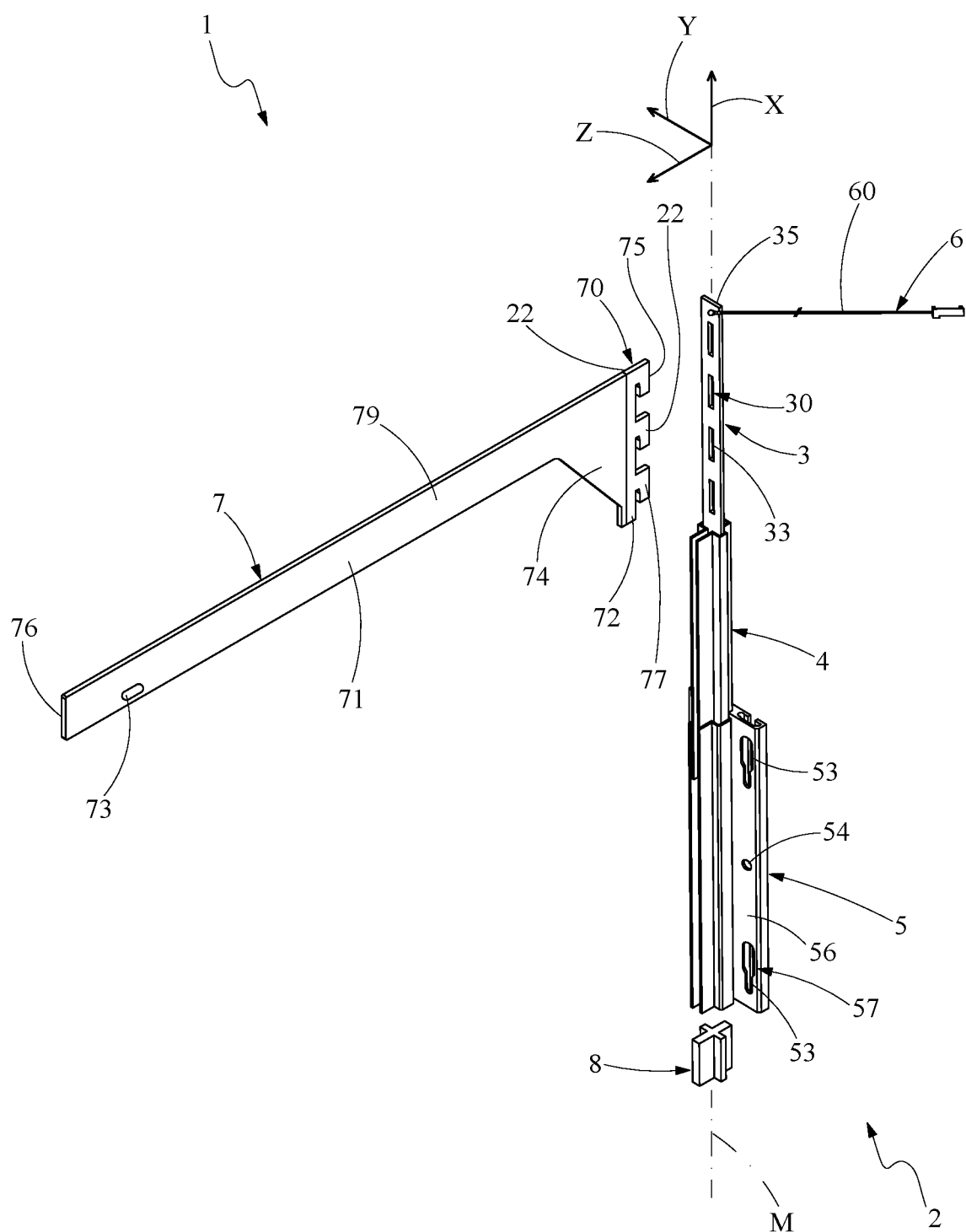
FIG. 1 is a perspective view of a shelf support system according to the invention.
Figure 2:
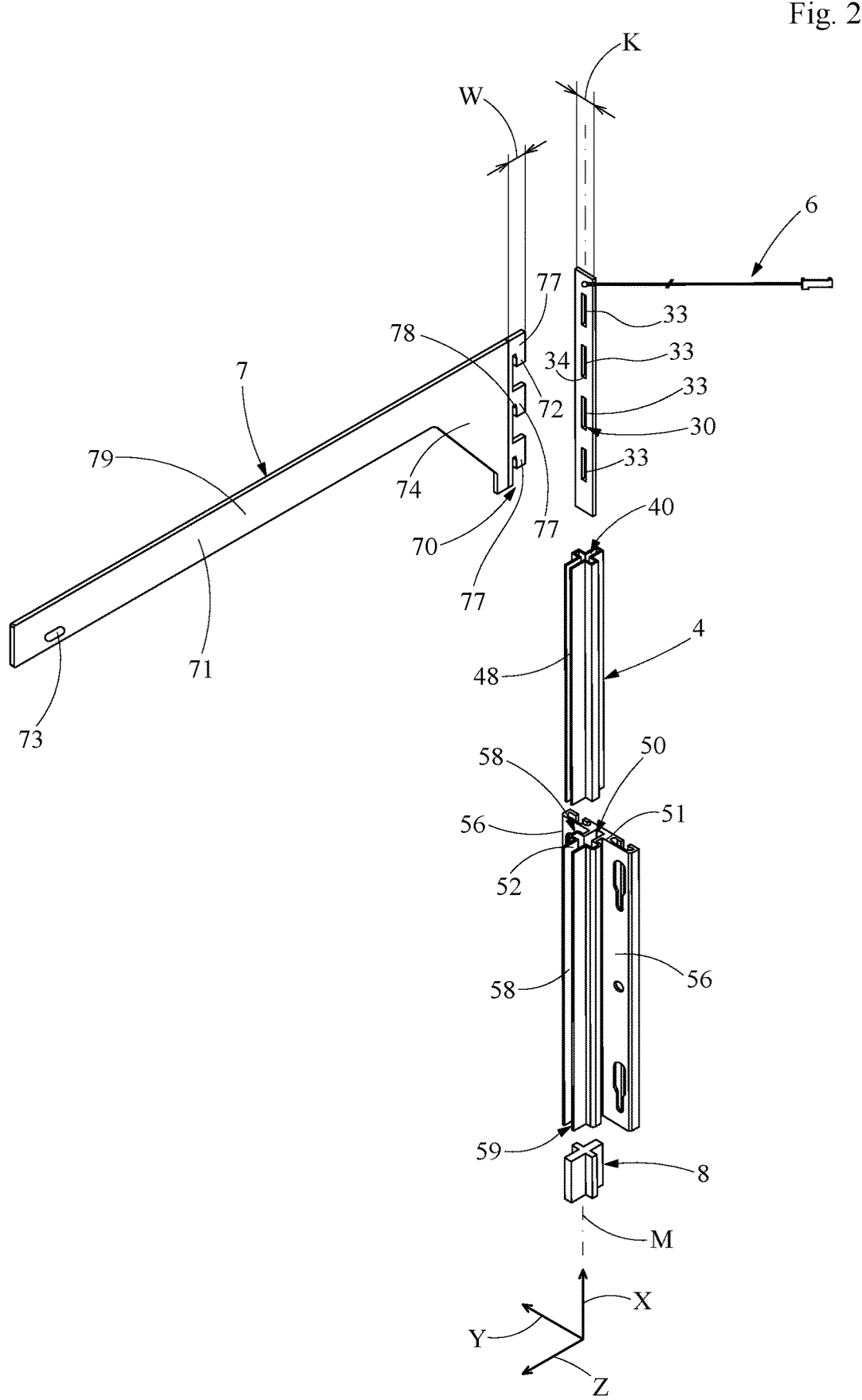
FIG. 2 is an exploded view of the shelf support system of FIG. 1.
Figure 3:
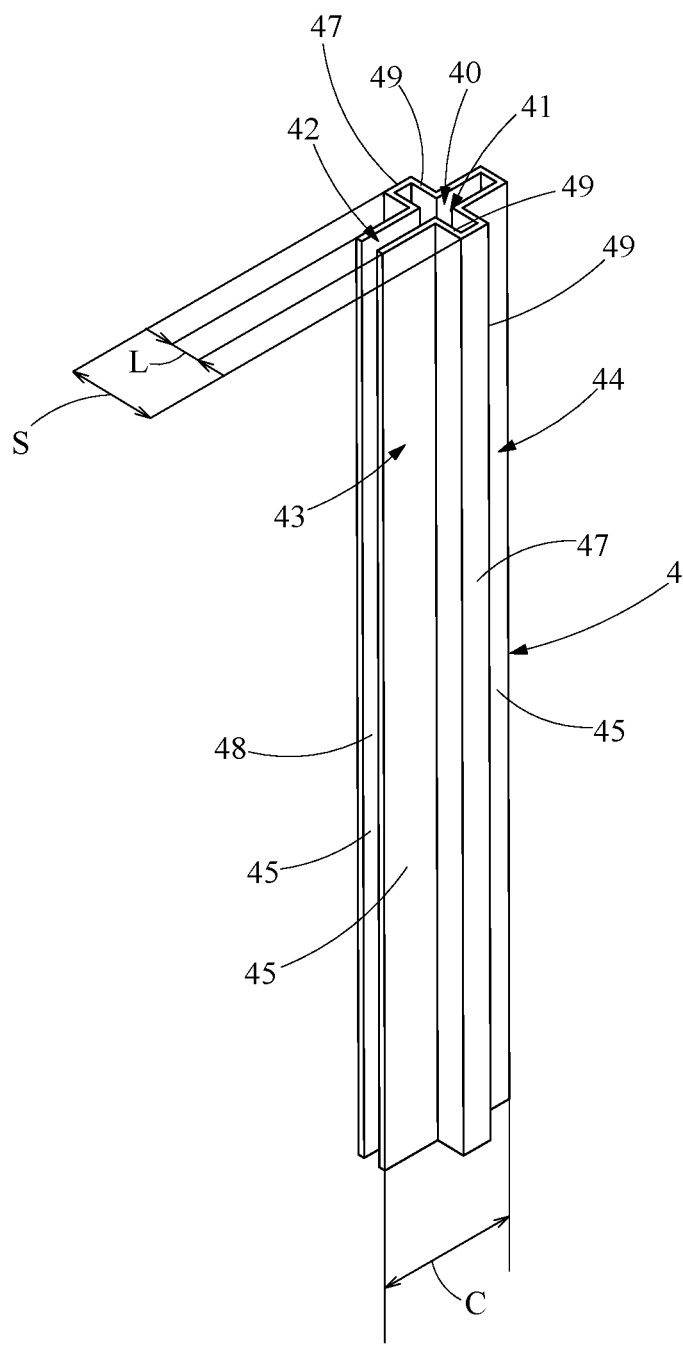
FIG. 3 is a perspective view of the insulating element of the system which is illustrated in FIGS. 1 and 2.
Figure 3:
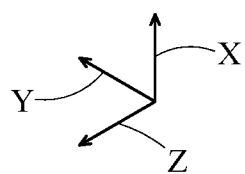

In the figures, a shelf support system which is constructed according to the present invention there is generally indicated with the reference 1.

The system 1 comprises an upright 2 which in turn includes a rack 3 which is made of electrically conductive material, an insulating element 4 which is made of a first electrically insulating material and a profile-member 5 which is made of an electrically conductive material. The first electrically insulating material may be polycarbonate V0.

In FIG. 1, part of the insulating element 4 and the profile-member 5 are not illustrated for reasons of visual clarity.

The system 1 comprises a power supply device 6 which is suitable for supplying electrical power to the rack 3. The insulating element 4 is interposed between the rack 3 and the profile-member 5 in order to prevent a passage of electric current from the rack 3 to the profile-member 5.

In a Cartesian reference system XYZ associated with the rack 3, it is possible to define a longitudinal direction X, a transverse direction Y and a connection direction Z.

A longitudinal axis M of the upright 2 extends parallel with the longitudinal direction X. The upright 2 extends mainly along its axis M, i.e. along the longitudinal direction X as well as the profile-member 5, the insulating element 4 and the rack 3. Therefore, the profile-member 5, the insulating element 4 and the rack 3 may be considered to be longitudinal members. The rack 3 has a substantially rectilinear and flat shape. In other words, a thickness thereof has marginal dimensions with respect to a length and width thereof.

The profile-member 5 comprises a cavity 50 and the insulating element 4 is configured to be inserted in the cavity 50. The insulating element 4 comprises a housing 40 and the rack 3 is configured to be inserted in the housing 40 of the insulating element 4. The cavity 50 and the housing 40 extend in the longitudinal direction X.

The rack 3 can be inserted in a sliding manner in the housing 40 of the insulating element 4 and the insulating element 4 is in turn able to be inserted in a sliding manner in the cavity 50 of the profile-member 5. These insertions can be carried out in the longitudinal direction X.

The rack 3 comprises a connection structure 30 which is suitable for connecting a shelf to the shelf support system 1.

The shelf support system 1 includes a shelf holder bracket 7 which is made of electrically conductive material. The bracket 7 can be connected to the upright 2 and comprises a body 71 which is suitable for supporting the shelf. The bracket 7 comprises a connection portion 70 which can be connected to the connection structure 30 of the rack 3.

The bracket 7 is covered with an electrically insulating covering 79 and this covering 70 covers the bracket 7 with the exception of a first area 72 at the connection portion 70 and a second area 73 on the body 71.

The rack 3 and the bracket 7 may have been subjected to a copper-plating and nickel-plating processing operation. The electrically insulating covering 79 is preferably a paint coating with epoxy powder. The paint coating is applied above the copper-plating and nickel-plating processing of the bracket.

The body 70 can be shaped as a bracket. This bracket may extend in a substantially rectilinear manner. In some alternative embodiments which are not illustrated, the bracket may be inclined, for example, downwards.

The body 70 may comprise a first end 75 and a second end 76, these ends 75, 76. The connection portion 70 may be placed at the first end 75.

The body 70 may include a reinforcement wall 74, which is preferably positioned near the connection portion 70. The reinforcement wall 74 is formed so as to reinforce the bracket 70. The reinforcement wall 74 is advantageously tapered in the direction towards the second end 76.

The second area 73 is positioned near the second end 76 of the body 71. The second area 73 has a limited extent and, in the case illustrated, it is shaped as an electrical contact with an elliptical shape. In alternative embodiments which are not illustrated, the second area 73 may, for example, be positioned on the reinforcement wall 74. In additional alternative embodiments which are not illustrated, the bracket 7 may comprise a plurality of second areas 73, for example, a second area 73 which is positioned near the second end 76, an additional second area 73 which is placed at the support portion 74, etc. The bracket 7 may comprise a number of second areas 73 equal to the number of electrical elements which have to be supplied by means of the system 1.

The first area 72 extends at the connection portion 70. The connection portion 70 of the bracket 7 is suitable for being connected to the support structure 30 of the rack 3. The connection portion 70 of the bracket 7 may comprise a plurality of connection elements 77. In the embodiment illustrated, three connection elements 77 are present. Each connection element 77 is preferably shaped as a tooth.

The connection structure 30 of the rack 3 may comprise a plurality of through-holes 33 which are suitable for receiving respective connection elements 77. The through-hole 33 is suitable for receiving the connection element 77 in a connection direction Z. The connection elements 77 are spaced apart from each other and the holes 33 are spaced apart from each other so as to allow multiple connections between connection elements 77 and respective holes 33. The hole 33 of the rack 3 may also be referred to as a lozenge.

The connection element 77 may comprise a channel 78 which is suitable for moving into abutment against a lower edge 34 of the respective hole 33. It is thereby possible to engage the connection element 77 with the respective hole 33 so as to connect the bracket 7 to the rack 3 in a particularly stable manner.

The hole 33 has a shape which complements the shape of the connection element 77. In the illustrated case, the hole 33 has a square shape and has such dimensions to allow the passage of the respective connection element 77.

The housing 40 of the insulating element 4 comprises a seat 41 which is suitable for receiving the rack 3. This seat 41 and the rack 3 are connected by means of shape coupling connection, i.e. the rack 3 has an external profile with a shape which complements the shape of an internal profile of the seat 41. The seat 41 shaped in this manner makes it easier for the rack 3 to slide inside the seat 41 in the longitudinal direction X.

The insulating element 4 may comprise transverse walls 49 which delimit the seat 41. These transverse walls 49 preferably extend in the transverse direction Y. The transverse walls 49 can be mutually parallel. The rack 3 can slide in the longitudinal direction X parallel with these transverse walls 49 during the insertion thereof in the housing 40.

The spacing between the transverse walls 49 defines a width of the seat 41. The width of the seat 41 substantially corresponds to a thickness of the rack 3.

A width S of the transverse walls 49 may be at least equal to a width K of the rack 3. These dimensions are intended to be understood in the transverse direction Y. The transverse walls 49 can be closed at the transverse ends 47 thereof, limiting possible movements of the rack 3 in the transverse direction Y. Preferably, the width K is between 15 and 25 mm.

The insulating element 4 comprises an opening 48, through which the bracket 7 can be introduced into the housing 40 of the insulating element 4 so as to be connected to the rack 3.

The housing 40 of the insulating element 4 comprises a channel 42 which is formed so as to guide the insertion of the connection portion 70 of the bracket 7 in the housing 40.

The insulating element 4 may comprise lateral walls 45 which delimit the channel 42. These lateral walls 45 preferably extend in the connection direction Z. The lateral walls 45 may be parallel with each other. The bracket 7 may slide in the connection direction parallel with these lateral walls 45 during the insertion thereof into the housing 40.

The spacing between the lateral walls 45 defines a width L of the channel 42. The width L of the channel 42 may correspond to a thickness of the connection elements 77 which, in the case illustrated, also corresponds to a thickness of the support structure 70 and the bracket 7 itself. A width L of the channel 42 may substantially correspond to a width of the holes 33 of the connection structure 30 of the rack 3. These dimensions are intended to be understood in the transverse direction Y. Preferably, the width L is between 4 and 6 mm.

The housing 40 is shaped in such a manner that the channel 42 is placed at the connection structure 30 of the rack 3.

A width C of the lateral walls 45 may be at least equal to a width W of the first area 72 of the bracket 7. The width C of the lateral walls 45 may be at least equal to a length of the support portion 70. These dimensions are intended to be understood in the connection direction Z. Preferably, the width C is between 25 and 30 mm.

The insulating element 4 is shaped so as to wrap around opposite sides 22 of the first area 72, in particular the lateral walls 45 wrap around opposite sides 22 of the first area 72 so as to be interposed between these opposite sides 22 and the profile-member 5. These opposite sides 22 preferably extend in a plane parallel with the plane defined by the longitudinal direction X and the connection direction Z.

The insulating element 4 may comprise a front portion 43 and a rear portion 44.

The front portion 43 includes the opening 48, through which the bracket 7 can be introduced into the channel 42 so as to be connected to the rack 3.

The rear portion 44 is suitable for receiving the connection portion 70 of the bracket 7 when the bracket 7 is connected to the rack 3. The rear portion 44 may be closed in such a manner that the connection portion 70 of the bracket 7 can move into abutment against it.

The lateral walls 45 and the transverse walls 49 can be perpendicular to each other, as in the embodiment illustrated in the figures. In this case, the insulating element 4 will have a cross-like shape, preferably a hollow cross which is open in the direction towards the bracket 7. This configuration allows the production of a particularly stable connection between the rack 3 and the insulating element 4 and between the insulating element 4 and the profile-member 5. This configuration further allows optimization of the spaces. In this manner, the channel 42 and the seat 41 of the housing 40 can be shaped so as to be rectilinear and perpendicular to each other. The channel 42 may be formed so as to intersect centrally with the seat 41.

The cavity 50 of the profile-member 5 and the insulating element 4 are connected by means of shape coupling connection, i.e. an external profile of the insulating element 4 has a shape which complements the shape of an internal profile of the cavity 50. In this manner, the insulating element 4 can slide in the longitudinal direction X inside the cavity 50 of the profile-member and the movement thereof is limited in the other directions by walls of the profile-member 50 which delimit the cavity 50 thereof.

In the embodiment illustrated, the cavity 50 is shaped as a cross. Said cavity 50 comprises a second seat 51 which is suitable for receiving the seat 41 of the insulating element 4. Said cavity 50 comprises a second channel 52 which is suitable for receiving the channel 42 of the insulating element 4. Said second channel 52 comprises in turn a second opening 58, through which the connection portion 70 can pass in order to be connected to the rack 3.

The profile-member 5 is configured as a drawing member made of anodized aluminum and comprises two lateral portions 56, each of which extends parallel with the transverse direction Y. The profile-member 5 comprises a connection device 57 which is suitable for connecting the system 1 to an external element, for example, a wall.

The connection device 57 may comprise two lozenges 53 and a central hole 54. The central hole 54 may serve to connect the system 1 to the external element, for example, by means of a threaded connection. For example, the two lozenges 53 may serve to fix a panel having substantially the dimensions of the wall portion between a pair of uprights 2.

The upright 2 may comprise a spacer 8 which is made of a second electrically insulating material. The spacer 8 can be inserted into the cavity 50 through a lower opening 59 of the profile-member 5.

The spacer 8 and the cavity 50 of the profile-member 5 are connected by means of shape coupling connection. The spacer 8 is retained in the cavity 50 of the profile-member 5 by a threaded plate (not illustrated) which is connected to the profile-member 5. In the embodiment illustrated, the spacer is shaped as a cross.

By means of the spacer 8, it possible to block movements of the rack 3 and the insulating element 4 in the longitudinal direction X downwards, preventing it from coming out of the profile-member 5 at the bottom.

The second electrically insulating material is a polymer material, more preferably polycarbonate, even more preferably polycarbonate V0.

The power supply device 6 comprises a riveted unipolar wire 60 which is connected to the rack 3 and a power supply (not illustrated).

The wire 60 may be connected at an upper end 35 of the rack 3. The wire 60 may leave the profile-member 50 through an upper opening 58 of the profile-member 5.

The invention claimed is:

1. A shelf support system (1) comprising an upright (2) which comprises:
   a profile-member (5) made of electrically conductive material and comprising a cavity (50),
   an insulating element (4) made of a first electrically insulating material and configured to be inserted in the cavity (50) of the profile-member (5) and comprising a housing (40),
   a rack (3) made of electrically conductive material and comprising a connection structure (30) suitable for connecting a shelf to the shelf support system (1), and
   a power supply device (6) configured to supply electrical power to the rack (3),
   the rack (3) being configured to be inserted in the housing (40) of the insulating element (4) so that the insulating element (4) is interposed between the rack (3) and the profile-member (5) in order to prevent a passage of electric current from the rack (3) to the profile-member (5),
   the connection structure (30) of the rack (3) comprising a hole (33) configured to be connected to a connection element (77) associated with the shelf.

2. The shelf support system (1) according to claim 1, wherein the rack (3) is shaped as a longitudinal member and generally extends in a longitudinal direction (X).

3. The shelf support system (1) according to claim 2, wherein the connection structure (30) of the rack (3) comprises a plurality of holes (33) which are arranged in the longitudinal direction (X).

4. The shelf support system (1) according to claim 1, wherein the connection element (77) is shaped as a tooth.

5. The shelf support system (1) according to claim 1, wherein the housing (40) of the insulating element (4) comprises a seat (41) configured to receive the rack (3), the seat (41) and the rack (3) being connected by a shape coupling connection.

6. The shelf support system (1) according to claim 1, wherein the cavity (50) of the profile-member (5) and the insulating member (4) are connected by a shape coupling connection.

7. The shelf support system (1) according to claim 1, wherein the upright (2) comprises a spacer (8) which is made of a second electrically insulating material, the spacer (8) either being insertable in the cavity (50) of the profile-member (5) for closing the profile-member (5) downwardly so as to become an end stop element for the insulating element (4) and for the rack (3), or being insertable in the housing (40) of the insulating element (4) so as to close the insulating element (4) downwardly so as to become an end stop element for the rack (3).

8. The shelf support system (1) according to claim 1, wherein the first electrically insulating material is a polymer material.

9. The shelf support system (1) according to claim 1, wherein the power supply device (6) comprises an electric wire (60) connected to the rack (3).

10. The shelf support system (1) according to claim 1, comprising a shelf holder bracket (7) made of electrically conductive material, comprising a body (71) suitable for supporting the shelf and a connection portion (70), connectable to the connection structure (30) of the rack (3) for supporting the shelf with the system, the connection portion (70) including the connection element (77), said shelf holder bracket (7) being covered with an electrically insulating covering (79) with the exception of a first area (72) which extends at the connection portion (70) so as to allow passage of electric current from the rack (3) to the shelf holder bracket (7), and of a second area (73) which extends on the body (71) so as to allow passage of electric current from the shelf holder bracket (7) to an electrical element connected to the shelf holder bracket (7) at the second area (73).

11. The shelf support system (1) according to claim 10, wherein the electrically insulating covering (79) comprises a paint coating.

12. The shelf support system (1) according to claim 10, wherein the first area (72) extends so as to be completely inside the insulating element (4) when the connection portion (70) is connected to the connection structure (30) of the rack (3).

13. The shelf support system (1) according to claim 12, wherein the insulating element (4) is shaped so as to wrap around the first area (72) of the shelf holder bracket (7) when it is connected to the rack (3).

14. The shelf support system (1) according to claim 10, wherein the second area (73) is shaped as an electrical contact.

15. The shelf support system (1) according to claim 10, wherein the housing (40) of the insulating element (4) comprises a channel (42) shaped so as to guide the insertion of the shelf holder bracket (7) into the housing (40).

16. A shelving unit comprising a shelf support system (1) according to claim 10, and at least one shelf connected to the shelf support system (1).

* * * * *